April 9, 1946.  S. V. MADDOX  2,398,319
CONTROL SYSTEM FOR AIRCRAFT ENGINES
Filed Aug. 29, 1944  3 Sheets-Sheet 1

April 9, 1946.        S. V. MADDOX        2,398,319
CONTROL SYSTEM FOR AIRCRAFT ENGINES
Filed Aug. 29, 1944        3 Sheets-Sheet 2
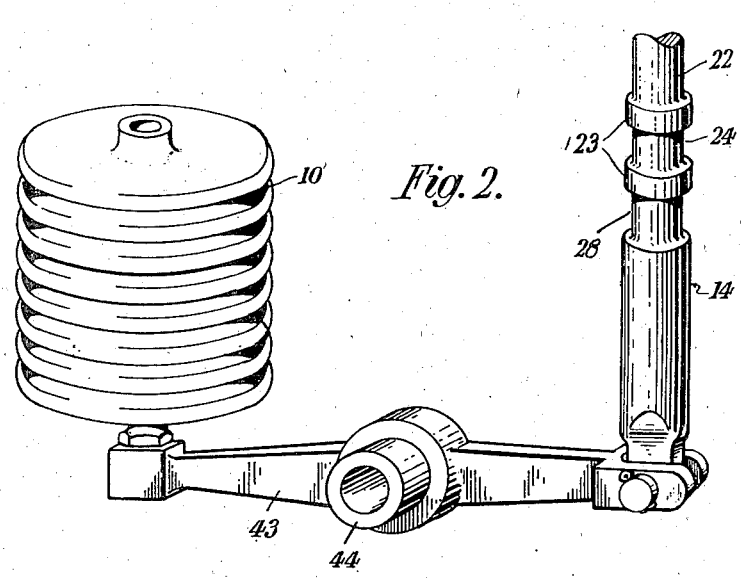
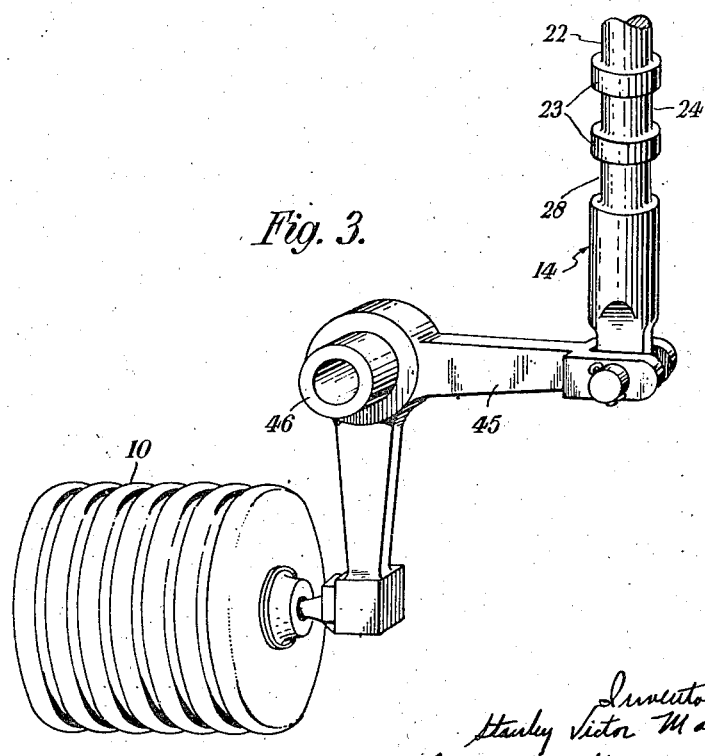

April 9, 1946.    S. V. MADDOX    2,398,319
CONTROL SYSTEM FOR AIRCRAFT ENGINES
Filed Aug. 29, 1944    3 Sheets-Sheet 3

Inventor
Stanley Victor Maddox
By Moss, Nolte, Crews & Berry
Attys.

Patented Apr. 9, 1946

2,398,319

UNITED STATES PATENT OFFICE 2,398,319

CONTROL SYSTEM FOR AIRCRAFT ENGINES

Stanley Victor Maddox, Cheylesmore, Coventry, England, assignor to H. M. Hobson (Aircraft & Motor) Components Limited, London, England Application August 29, 1944, Serial No. 551,705
In Great Britain January 3, 1944

11 Claims. (Cl. 123—103)

This invention has for its object to provide means whereby, in a control system for aircraft engines, a single stack of capsules may be arranged to operate two engine controls in desired relationship with boost pressure.

The invention accordingly provides a control system for an aircraft engine, comprising a single stack of capsules enclosed in a chamber having an inlet for connection to boost pressure, a two-section sliding valve arranged to receive axial movement from the capsule stack on expansion or contraction thereof, a pair of servo motors associated respectively with the two sections of the sliding valve and arranged to be operated thereby to actuate separate engine controls in desired relationship with boost pressure.

In the preferred form of the invention, one section of the valve is of piston form and is associated with a throttle-controlling servo piston, while the other section is of scroll form and constitutes the operating valve of a vane-type servo motor for operating a second engine control, e. g. that controlling the ignition timing, in desired relationship with boost pressure.

Figure 1:
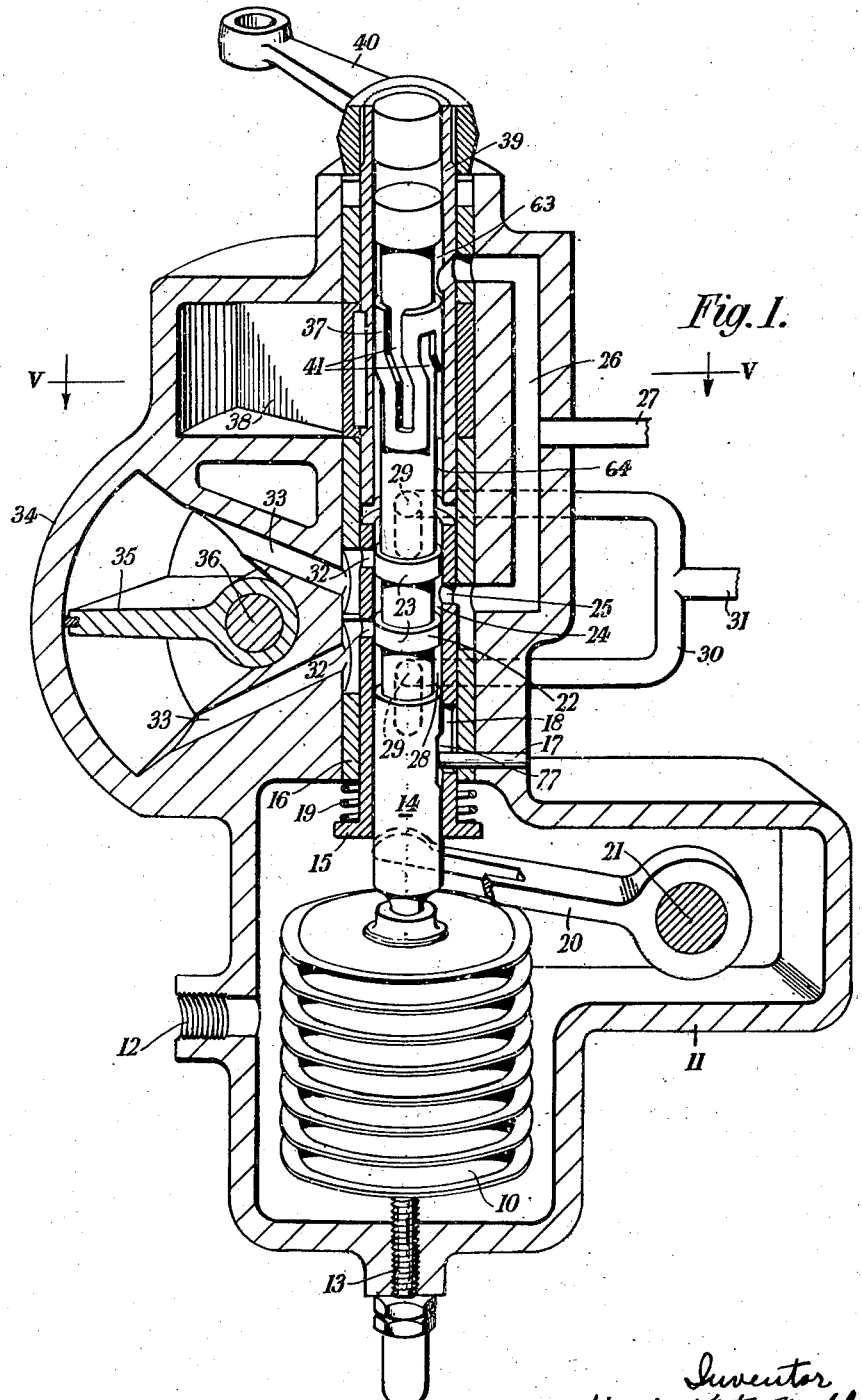

Three alternative forms of apparatus according to the invention will now be described in detail, by way of example, with reference to the accompanying drawings, in which Fig. 1 is a vertical section through the capsule stack, two-section valve and associated servo pistons of the first embodiment, Figs. 2 and 3 show alternative connections between the capsule stack and the two-section valve.

Figure 4:
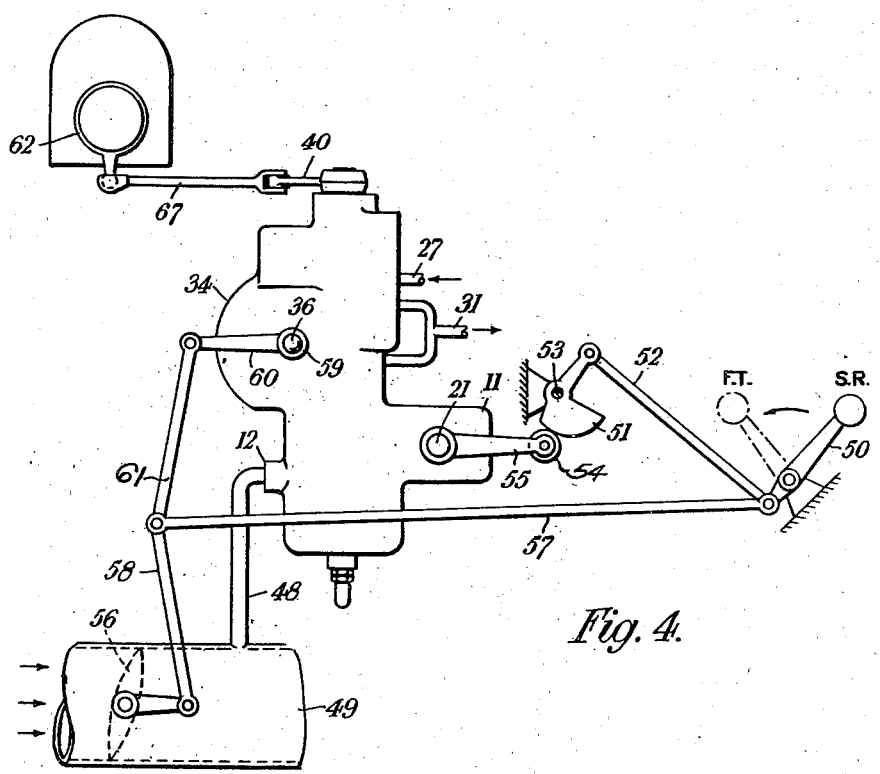
Figure 5:
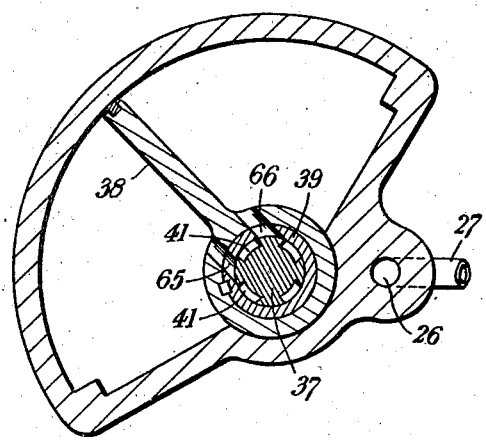

Fig. 4 is a diagrammatic showing of the connections between the servo motors and the throttle and ignition controlling means respectively, and Fig. 5 is a section on line V—V in Fig. 1.

Considering Figs. 1 and 4 first of all, an evacuated capsule stack 10 is located in a chamber 11 having an inlet 12 for connection to boost pressure. This connection is established by a pipe 48 communicating with the induction pipe 49. The boost pressure to which the capsule stack 10 is exposed is thus in this instance the intake manifold pressure and not the supercharger pressure. The lower end of the stack is anchored by an adjustable screw 13 and its upper end is directly connected to a sliding valve 14 which is moved up and down as the capsule stack expands or contracts. The capsule stack may be wholly evacuated or may, as described for example in application Serial No. 551,703 comprise a section exposed to exhaust back pressure. Surrounding the lower end of the sliding valve is a ported sleeve 15 which is slidable in a fixed outer sleeve 16 but held against rotation by a pin 17 engaging a slot 18 in the ported sleeve. The end of the pin 17 projects into a slot 77 in the valve 14 and so prevents rotation of the valve. This sleeve 15 is biased by a spring 19 which maintains contact between the sleeve and an operating lever 20 beneath it. The lever 20 is affixed to a pivot pin 21 and operated from the pilot's throttle lever 50 (Fig. 4) by the agency of a cam 51. This cam, which is connected to the lever 50 by a link 52 and is pivotally mounted at 53, operates on a follower 54 on an arm 55 fixed to pivot pin 21, and this serves to rock lever 20 to effect axial movement of the ported sleeve 15 and thereby provide the required relation between boost pressure and pilot's lever position. The lever 50 is movable between a slow running position S. R. and a full throttle position F. T., and operates the throttle valve 56 through the agency of links 57, 58.

The lower section 22 of the sliding valve is of piston form, having two lands 23. A circumferential groove 24 between the lands is connected, via a port 25 and passage 26 to an oil pressure inlet 27, and circumferential grooves 28 above the top land and below the lower one are connected by ports 29 and passages 30 to an exhaust outlet 31. The ports 32 in the sleeve 15 are normally opposite the lands 23, the control communications, via passage 33, between the grooves in the valve and the opposite ends of a housing 34 within which is disposed a servo vane 35, movable about a pivot 36. To an extension 59 of the vane 35 is fixed an arm 60 which serves, through the agency of a link 61 to adjust the position of the throttle valve 56.

When the valve 14 moves up, due to a fall in boost, pressure oil is admitted above the servo vane 35, and the space beneath the vane is connected to exhaust. The vane then moves downwardly opening the throttle valve 56 until the boost has been restored to a value at which the lands 23 on the valve once more mask the ports 32 in the sleeve. Axial movement of the sleeve 15 under the action of the variable datum lever 20 will likewise cause the servo vane to move and alter the position of the throttle valve 56 so as to establish a boost at the required new value, at which the lands 23 on the valve will again mask the ports 32 in the sleeve.

The upper section 37 of the valve is of scroll form and associated with a vane type servo motor, the vane 38 of which is fixed to a sleeve 39 surrounding the valve and carrying an arm 40 by which the vane 38 operates, through links 61, to adjust the magneto 62 and effect the required alterations in ignition timing. The scroll valve 37 and associated vane type servo motor are of the form described in application Serial No. 551,703, the shape of the scroll grooves 41 in the valve determining the relationship between ignition timing and boost pressure.

As will be clear from Figs. 1 and 5, alternate grooves 41 in valve section 37 are closed at their lower ends and communicate at their open upper ends, via annular space 63 and passage 26, with the high pressure inlet 27. The other alternate grooves 41 are closed at the top and communicate at their open lower ends, via annular space 64 and passage 30, with the exhaust outlet 31. Ports 65, 66 in sleeve 39 communicate with opposite sides of servo vane 38 and are normally masked by adjacent lands of valve section 37. Axial movement of valve section 37 will, however, connect one of ports 65, 66 to a pressure groove 41 and the other to an exhaust groove 41, with the result that servo vane 38 will execute a rotary movement in the appropriate direction, this movement ceasing when ports 65, 66 are again masked by lands of the valve section 37.

It will be appreciated that the boost control differs from normal practice in that the lower end of the capsule stack 10 remains stationary, the variations in datum being provided by movement of the sleeve 15. If more convenient the lower piston-type section of the valve may be associated with a piston-type servo motor instead of the above-described vane type servo. The main advantage of the arrangement is that a single capsule stack only is required for controlling two functions of the engine.

In Fig. 1, the capsule stack 10 is connected directly to the two-section valve 14. In the alternative arrangement shown in Fig. 2, these parts are connected through the agency of a link, rotatable about a central pivot 44, while in Fig. 3 they are connected by a bell-crank lever 45 pivoted at 46.

What I claim as my invention and desire to secure by Letters Patent is:

1. A control system for an aircraft engine, comprising a chamber having an inlet for connection to boost pressure, a stack of capsules enclosed in said chamber, a two-section sliding valve arranged to receive axial movement from the capsule stack on expansion and contraction thereof, a pair of servo pistons each associated with one of the two sections of the sliding valve, and a pair of separate engine controls associated each with one of the servo pistons, both servo pistons being arranged to be operated on movement of the sliding valve in response to changes in boost pressure, each by the appertaining section of said valve, each servo piston actuating the associated engine control in desired relationship with boost pressure and independently of the other engine control.

2. A control system for an aircraft engine, comprising a chamber having an inlet for connection to boost pressure, a stack of capsules enclosed in said chamber, an engine throttle, a second engine control, requiring adjustment independently of the throttle in desired relationship with boost pressure, a two-section sliding valve arranged to receive axial movement from the capsule stack on expansion and contraction thereof, one section of said valve being of piston form and the other of scroll form, a servo piston arranged to receive movement from the piston section of said valve and thereby to effect adjustment of the throttle, and a servo vane arranged to receive movement from the scroll section of the valve and thereby to effect adjustment of the second engine control.

3. A control system for an aircraft engine, comprising a chamber having an inlet for connection to boost pressure, a stack of capsules enclosed in said chamber, an engine throttle, means for controlling the ignition timing, a two-section sliding valve arranged to receive axial movement from the capsule stack on expansion and contraction thereof, one section of said valve being of piston form and the other of scroll form, a servo piston arranged to receive movement from the piston section of said valve and thereby to effect adjustment of the throttle, and a servo vane arranged to receive movement from the scroll section of the valve and thereby to effect adjustment of the ignition timing control means independently of said adjustment of the throttle.

4. Apparatus as claimed in claim 2, comprising a ported sleeve surrounding the piston section of the valve and serving to connect, under the control of the valve, opposite sides of the throttle controlling servo piston alternatively to pressure and exhaust, a pilot's throttle lever, and means operable by said lever for adjusting the axial position of said sleeve, and thereby varying the boost pressure.

5. Apparatus as claimed in claim 2, comprising a ported sleeve surrounding the piston section of the valve and serving to connect, under the control of the valve, opposite sides of the throttle-controlling servo piston alternatively to pressure and exhaust, a pivoted lever, a spring for maintaining said sleeve in contact with said pivoted lever, and means for rotating said lever about its pivot to effect axial displacement of said sleeve to vary the boost pressure.

6. In a control system for an aircraft engine, comprising a pair of engine controls requiring separate and independent adjustment in desired relationship with changes in boost pressure, a double servo motor, comprising a pressure sensitive device responsive to changes in boost pressure, a two-section sliding valve arranged to receive axial movement from said pressure sensitive device in response to changes in boost pressure, a pair of servo pistons each associated with one of the sections of said valve and arranged to be operated independently by said valve on change in the boost pressure, a connection between one of said servo pistons and one of said engine controls, and a connection between the other servo piston and the other engine control.

7. In a control system for an aircraft engine, comprising a pilot's throttle lever, a throttle valve and a second engine control requiring adjustment, independently of said throttle valve, as a desired function of boost pressure, a boost control device, comprising a chamber having an inlet for connection to boost pressure, a stack of capsules enclosed in said chamber, a single two-section sliding valve arranged to receive axial movement from the capsule stack on expansion and contraction thereof, one section of said valve being of piston form and the other of scroll form, a servo piston arranged to receive movement from the piston section of said valve and thereby to effect adjustment of the throttle valve to maintain the boost pressure at a selected value, a servo vane arranged to receive movement from the scroll section of said valve and thereby to effect adjustment of the second engine control, and means operated by the pilot's lever and cooperating with the piston section of said valve for varying the selected boost pressure in desired relationship with the position of said pilot's throttle lever.

8. A variable datum boost control device for an aircraft engine, which serves to operate an engine throttle valve to maintain the boost pressure at a selected value and to vary the adjustment of another engine control in desired relationship with the selected boost pressure, said device comprising a chamber having an inlet for connection to boost pressure, a pressure responsive member located in said chamber, a single two-section control valve arranged to receive movement from said pressure responsive member on change in the boost pressure, a pair of servo pistons, one for operating the throttle valve and the other for operating said other engine control, the servo pistons being respectively associated with the two sections of the control valve, a housing for each servo piston, pressure and exhaust connections to the two housings for permitting, on movement of said control valve and under the control of the respective sections thereof, flow of hydraulic fluid to said housings to effect corresponding movement of both of said servo pistons, and manually operable means, associated with that section of the control valve allocated to the throttle-operating servo piston, for varying the selected boost pressure.

9. A variable datum boost control device for an aircraft engine, comprising a casing, a servo piston for controlling engine throttle position to maintain the boost pressure at a selected value, said servo piston being movable in a chamber in the casing, a servo vane for controlling ignition timing in desired relationship with selected boost pressure, said servo vane being movable in a second chamber in the casing, an axially slidable control valve common to the servo piston and the servo vane, said valve having a piston section allocated to the servo piston and a scroll section allocated to the servo vane and serving, when displaced, to control admission of hydraulic pressure fluid to and discharge of fluid from both of said chambers to permit of corresponding and simultaneous movement of said piston and vane, a third chamber in the casing having an inlet for connection to boost pressure, a stack of capsules located in said chamber, said stack being anchored at one end and connected at the other end to said control valve and serving to effect axial movement of said control valve on change in the boost pressure, and manually operable means associated with the piston section of said control valve for varying the selected boost pressure.

10. Apparatus as claimed in claim 9, comprising a ported sleeve surrounding the piston section of the valve and serving to connect, under the control of said valve, opposite sides of the servo piston alternatively to pressure and exhaust, and sleeve being axially displaceable by manual control to vary the selected boost pressure.

11. Apparatus as claimed in claim 9, comprising a ported sleeve surrounding the piston section of the valve and serving to connect, under the control of said valve, opposite sides of the servo piston alternatively to pressure and exhaust, a pivoted lever in said third chamber of the casing, a spring for maintaining said sleeve in contact with said lever, and manually operable means for rotating said lever about its pivot to effect axial displacement of said sleeve to vary the selected boost pressure.

STANLEY VICTOR MADDOX.